Jan. 18, 1966 G. A. SMITH 3,230,377
SELF-STABILIZED THEODOLITE FOR MANUAL TRACKING
USING PHOTOSENSITIVE STABILIZING MEANS
Filed March 30, 1962 2 Sheets-Sheet 1
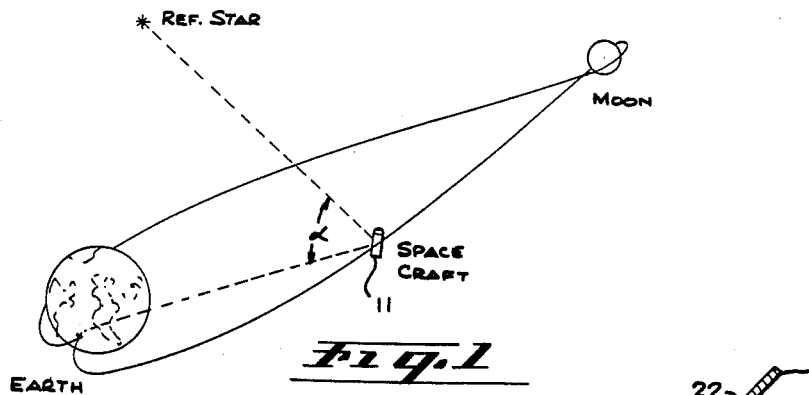
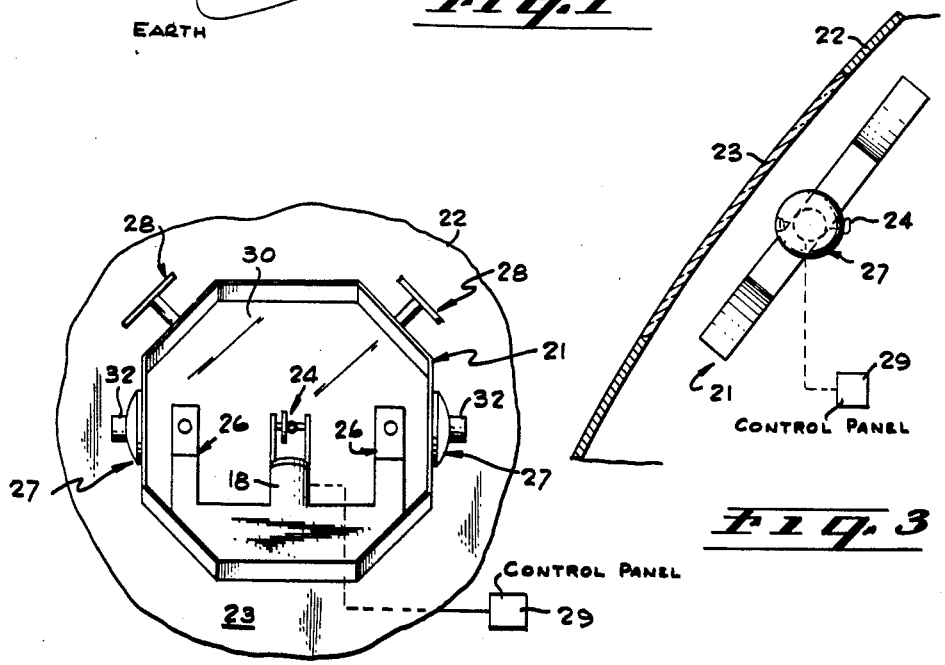
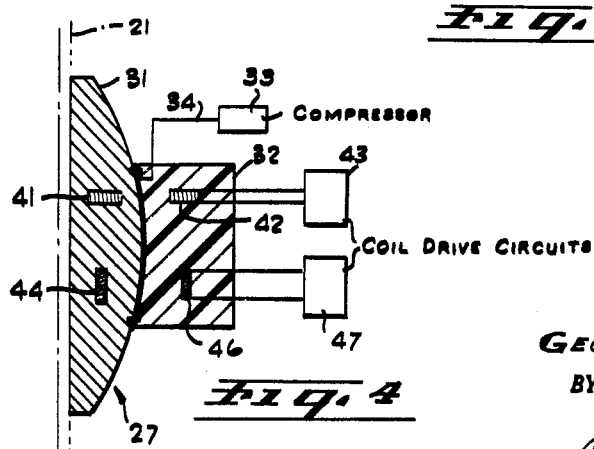
INVENTOR.
GEORGE ALLAN SMITH
BY
ATTORNEYS Jan. 18, 1966 G. A. SMITH 3,230,377
SELF-STABILIZED THEODOLITE FOR MANUAL TRACKING
USING PHOTOSENSITIVE STABILIZING MEANS
Filed March 30, 1962 2 Sheets-Sheet 2

INVENTOR.
GEORGE ALLAN SMITH
BY
ATTORNEYS

United States Patent Office 3,230,377
Patented Jan. 18, 1966

3,230,377
SELF-STABILIZED THEODOLITE FOR MANUAL TRACKING USING PHOTOSENSITIVE STABILIZING MEANS
George Allan Smith, Palo Alto, Calif., assignor to the United States of America as represented by the Administrator of the National Aeronautics and Space Administration
Filed Mar. 30, 1962, Ser. No. 183,979
15 Claims. (Cl. 250—203)
(Granted under Title 35, U.S. Code (1952), sec. 266)

The present invention relates in general to the navigation of a manned space vehicle, and more particularly to the determination upon such vehicle of the angular orientation of the line of sight between a target and an inertial reference system.

There have been advanced innumerable devices for aiding in navigation of aircraft, and numerous automatic navigational control systems have been advanced for directing missiles and the like. In the navigation of manned space vehicles, it is not necessary to provide this automatic navigation, for the operator or pilot is available to take readings and to operate controls. It has been suggested in connection with this type of navigation that angle measuring means, such as a theodolite, may be mounted upon a gyro-stabilized platform in order to isolate it from varying angular motions of the vehicle or space craft so that measurements of the line of sight can be made directly with respect to the vehicle. While this method of procedure theoretically provides the prerequisites, quite unnecessary and undesirable complications are introduced thereby. For example, tracking means mounted upon a gyro-stabilized platform must be phyically attached to the inner gimbal of the gyro, and this poses a difficult mechanical problem. Not only does this mounting location involve interference by outer gimbals and structure with the line of sight from the tracker, but it also introduces a disturbance torque directly into the reference system. Additionally, the problem of gyro drift requires at least periodic use of some type of stellar monitoring. As an alternative approach to the problem, it has been suggested that the tracking means could be mounted directly upon the space vehicle and then moved through a servo drive system, or the like, in accordance with variations from a stabilized platform. A differential could be employed in this system so that the line of sight would remain fixed in space in spite of vehicle motions, and yet respond to the line of sight changes introduced by an operator through the differential. The servo connection of a tracker or tracking means to a stable platform poses difficulties in obtaining angular pick-offs of information with sufficient accuracy to provide tracking within required limitations. Furthermore, problems of twist and flexure of the space vehicle between such a stabilized platform and the driven tracking means introduce additional errors in this system.

Although either of the above-discussed manner of establishing a desired inertial reference in a space vehicle are at least theoretically possible, the present invention provides a material advancement thereover in both simplicity and accuracy. The present invention, in brief, comprises a stabilized platform having a theodolite or the like mounted thereon. This platform is disposed within a space vehicle in substantially frictionless engagement therewith. Upon the platform there are disposed in predetermined fixed orientation a pair of star trackers, as are known in the art, and which produce error signals operating platform control means for varying the position of the platform to stabilize same in space in accordance with deviations of line of sight of the star trackers from direct alignment with predetermined reference stars. With the known accuracy of star trackers, and the available accuracy with which a vernier theodolite may be read, the invention hereof provides an accuracy within four or five seconds of arc.

It is an object of the present invention to provide an improved celestial navigational device including a telescopic angle measuring means mounted upon a stabilized platform in a space vehicle.

It is another object of the present invention to provide in a space vehicle a platform mounting a theodolite and directly stabilized from reference points in space by reaction against inertial space.

It is yet another object of the present invention to provide improved and simplified stabilization means for a theodolite platform in a space vehicle.

Various other objects and advantages of the present invention will become apparent to those skilled in the art from the following description of a preferred embodiment of the present invention taken together with the accompanying drawings, wherein:

FIGURE 1 illustrates an application of the present invention as regards celestial navigation;

FIGURE 2 is a schematic illustration of a platform with stabilization means mounting the platform within a space vehicle;

FIGURE 3 is an end view of the stabilized platform hereof illustrated as being mounted adjacent a transparent wall of the space vehicle;

FIGURE 4 is a sectional view through a stabilizing mounting means for the platform of the present invention;

Figure 5:
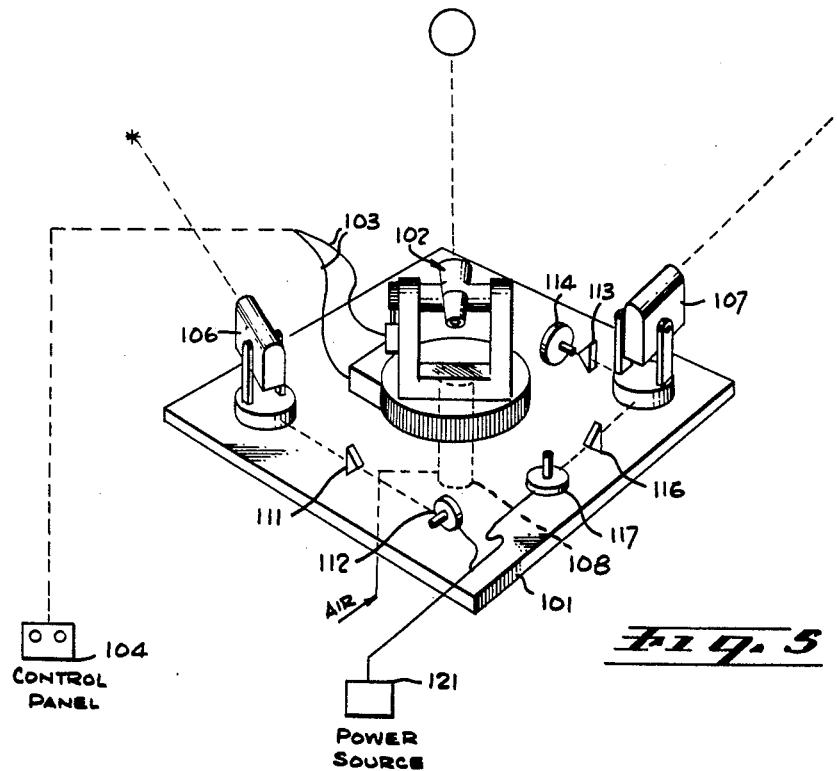
FIGURE 5 is a perspective view of a stabilized theodolite platform with alternative stabilization means.

The present invention, in brief, provides a platform upon which there is mounted a vernier theodolite or the like, which may be remotely operated and read, and a pair of star trackers. This platform is mounted within a space vehicle by stabilization means controlled from the star trackers. Initial precisional alignment of the star trackers with a pair of reference stars then provides for the production of error signals from the star trackers in proportion to the amount of deviation of same from the original alignment. These error signals are employed herein to control and drive platform mounting means connecting the platform to the space vehicle. In this manner the platform is maintained in precise position relative to inertial space, so that operation of the vernier theodolite by the pilot or operator of the space craft then provides target angle readings useful in navigation of the craft.

Considering now the present invention in somewhat greater detail, it is first noted that FIGURE 1 illustrates a space craft 11 traveling a path 12 from the earth about the moon and back to the same spot upon the earth. By measurement of the angle α between the earth and a reference star 13 and a notation of the time of such measurement, there is provided one vital bit of information for determining the relative position of the space craft at such noted time. This angle $a$ may be measured by a precision theodolie, i.e., a telescopic angle measuring means, and the present invention provides for obtaining a very precise measurement of the angle by an operator of the space craft and without the complexity of apparatus associated with prior art apparatus of this general type.

FIGURES 2 and 3 of the drawings show a platform 21 mounted within a space vehicle adjacent an exterior wall 22 thereof having a transparent portion 23 facing the platform. The platform itself may have any desired configuration and may, for example, be mounted in the astradome of a space vehicle. Upon the platform there is mounted a precision theodolite 24 and a pair of star trackers 26. Opening 30 in platform 21 enables an operator to view through theodolite 24 without disturbing the platform. The two trackers enable complete stabilization of platform 21 about three orthogonal axes. The platform itself is mounted in substantially frictionless engagement with the space vehicle, as by mounting means schematically illustrated at 27 of FIGURE 2. Devices 28 are provided for caging the platform, i.e. for locking the platform in fixed position relative to the space vehicle, for reasons set forth in more detail below. In FIGURE 2 there is illustrated by the block 29 an operators control panel available to the pilot and shown as being connected by a dashed line to the precision theodolite 24 upon the platform. Inasmuch as the platform and devices thereon must be mounted in a position adjacent a transparent wall of the space vehicle for viewing space therefrom, it is most convenient in many applications to provide for remote control and reading of the theodolite from this control panel 29 located in an instrument or control compartment of the vehicle readily available to the operator or pilot thereof.

As regards the mounting of the platform itself, this mounting is accomplished in a substantially frictionless manner in order that precise adjustments of the relative position of the platform and space vehicle may be readily made from the relatively small signals available from star trackers 26. While this type of mounting may be quite difficult in many applications, it is noted that the absence or minimization of gravity in outer space allows such mounting to be readily made. While various alternative mounting systems may be employed, there is herein illustrated in FIGURE 4 an air bearing mounting, although it will be appreciated that under certain circumstances it may only be necessary to tether the platform to the vehicle, inasmuch as it will normally float free in the absence of gravitational forces. In accordance with the present invention, there is provided stabilization means for moving the platform in order to maintain the precise orientation of the platform with respect to space references. FIGURE 4 illustrates a convex projection 31 upon the platform 21 and a mating concave mounting block 32 which is secured to the vehicle. In order to provide for free movement of the platform 21, the curved surfaces of all of the projections 31 thereon are formed as segments of a single sphere. Thus, the platform in essence comprises a sphere with the central portion thereof reformed as a hexagon. A layer of air is interposed between these mating spherical surfaces and sufficient air pressure for maintenance of such a layer may be provided by a compressor 33, illustrated in block form as being connected by a line 34 through the mounting block 32 to the conjunction of the spherical mating surfaces. As above noted, the lack of gravitational force minimizes the amount of air that must be provided in order to accomplish the air support of the platform, and for many purposes it is sufficient to provide only a hand pump for the compressor 33 illustrated. With a flow of air through the line 34, it will thus be seen that the platform is maintained between the separate mounting means 27 in substantially frictionless mounting upon the vehicle.

Provision is made for moving the platform 21 in three mutually perpendicular planes, so as to thereby precisely orient the platform as required to maintain its position fixed with regard to inertial space or reference points in space.

Controlled positioning of the platform is accomplished in the embodiment of the invention illustrated in FIGURE 4 by means of magnetic forces. The interaction of magnets and the controllably energized coils afford the controlled degree of force desired to accurately position the platform. As illustrated, there is disposed a first magnet 41 in the mounting element 31, and a corresponding coil or pair of coils 42 is disposed in the mounting block 32. This coil 42 is controllably energized by means 43 receiving input signals from one of the star trackers 26, as described in more detail below. A second magnet 44 is affixed within the mounting means 31 to interact with a coil or coils 46, disposed within the mounting block 32. This coil 46 is energized from one of the star trackers through means 47, as also described in some detail below. As illustrated, the first magnet 41 is so oriented in relationship to the coil 42 as to provide for a driving force upon the platform and mounting means 31 thereof in a horizontal plane perpendicularly to the plane of the illustration. The other magnet 44 is so oriented with respect to the coil 46 as to afford controllable driving force to the platform in the plane of the figure. Controllable movement of the platform in a third plane perpendicular to the two noted above may be afforded by the provision of appropriately oriented magnet coil combination in the other mounting means 27.

It will be appreciated that the platform may be mounted by any desired number of mounting means 27, and thus, for example, there may be employed four such means rather than two, as illustrated. An error signal produced from a star tracker through the dislocation of the center of line of sight thereof from a reference star will be applied through the control means for the coils to thereby energize the latter to displace the platform in appropriate planes, so that the star tracker then returns to precise alignment with the reference star. With the star trackers aligned with separate reference stars, preferably about 90 degrees apart, one of the star trackers produces error signals for motion in two perpendicular planes and the other star tracker produces an error signal for motion in the third plane. It is noted at this point that star trackers are well known in the art, so that no detailed description thereof is included herein. It is further noted that these trackers herein employed are not automatic in the sense that they align themselves with the reference star, but instead these star trackers produce error signals which in this instance are employed to reorient the platform upon which the star trackers are mounted, so as to maintain this platform in predetermined relationship to the reference points.

Figure 6:
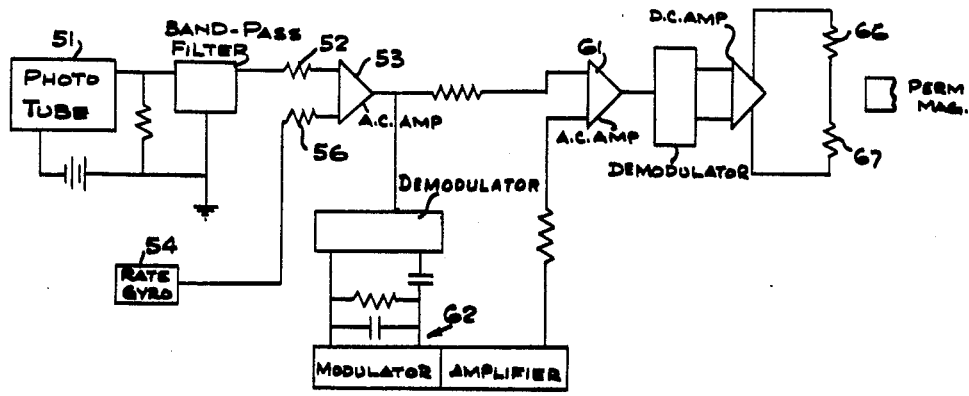
FIGURE 6 is a block diagram of one channel of a circuit suitable for utilization in the control of platform stabilization.

There is illustrated in FIGURE 6 a block diagram of one drive channel connecting a star tracker and a control coil interacting with a permanent magnet upon the theodolite platform. Referring to FIGURE 6, there will be seen to be illustrated a photo tube 51 which is adapted to be associated with one star tracking telescope 26. This photo tube generates, for example, a 400 cycle electrical error signal whose amplitude is proportional to the error angle as received from the star tracker, and the phase of which, with respect to the phase of the reference 400 cycle voltage, indicates the sense of the error signal. Thus, a deviation to the right of a center line of the line of sight of the telescopic star tracker, may for example, produce a positive phase variation, and to the left a negative phase variation. The signal from the photo tube is passed through a band pass filter, as indicated, to remove noise components thereof, and is then supplied through a summing resistor 52 to an alternating current amplifier 53. Damping may be provided in either or both of the input or intermediate stages of the channel, and there is illustrated a rate gyro 54 which is mounted to the platform of the invention hereof so as to be sensitive to the angular rate of motion of the platform about the axis in question. This rate gyro produces a voltage of the same frequency as the photo tube 51 with an amplitude proportional to the above noted rate and a phase indicative of the direction in which the rate is increasing. The output of the rate gyro is applied through a second summing resistor 56 to the amplifier 53, in an opposite sense to the signal applied from the photo tube. The output of this amplifier 53 is split, with one part proceeding directly through a summing resistor to a second A.C. amplifier 61. The other portion of the output signal from the amplifier 53 is employed for damping purposes and is applied to a demodulator or rectifier circuit, and thence through a lead network 62. The direct current signal from the lead network is then remodulated and amplified, as indicated, and is applied through a summing resistor to the input of the alternating current amplifier 61. The output of this amplifier 61 is demodulated and passed through a direct current push-pull amplifier providing direct current to the coils 66 and 67. These coils are located in proximity with a permanent magnet of the mounting means. With a zero error signal entering the last demodulator, there will be produced equal and opposite outputs from both sides of the push-pull D.C. amplifier so that equal currents flow through each coil and no net reaction torque occurs between the coils in circuit with this amplifier and the permanent magnet. An error signal passed through the circuit just described will produce a difference in the outputs of the two sides of the output amplifier, and consequently, will increase the current through one coil while decreasing the current through the other. There results a net reaction torque urging the permanent magnet to move in one or the other direction depending upon the relative phase of the error signal.

The drive channel circuit, briefly described above and illustrated in FIGURE 6, is relatively conventional, however, it is noted that the accuracy attained by the present invention requires care in circuit design and fabrication. With the appropriate phases and polarities being maintained throughout the circuit, a clockwise rotation of the platform from its referenced position will result in a counter clockwise restoring torque. As an example, a clockwise rotation of the platform from its referenced position produces an out-of-phase 400 cycles signal at the output of the photo tube. This signal remains out of phase into and out of the filter and into the amplifier 53. The signal, however, emerges from the amplifier as an in-phase signal and is applied directly to the second aligning current amplifier 61. The portion of the in-phase signal from the amplifier 53 directed through the lead circuit remains in-phase in the 400 cycle sense, although the phase of the modulation is advanced. This signal then is applied to the input of the A.C. amplifier 61 as an in-phase signal, and the demodulator connected to the output of this amplifier 61 delivers a direct current signal to the D.C. amplifier connected to the output thereof. The direct current output from this last D.C. amplifier then passes through the coils 66 and 67 to cause a counter clockwise torque being applied to the platform. An error signal caused by a counter clockwise rotation of the platform will produce opposite phases and polarities throughout the circuit in the manner described above, so as to thereby cause a clockwise restoring torque. Achievement of properly damped dynamic response is obtained by controlling the amount of rate gyro signal and lead network signal, however, it is noted that for many applications the rate gyro may be eliminated and all of the damping supplied by the lead network. Inasmuch as all of the components of the circuit illustrated in FIGURE 6 are quite conventional, no additional explanation of the circuit is included herein.

The present invention as described above in connection with a single preferred embodiment thereof will be seen to comprise four major portions, i.e., the precision theodolite, the star trackers, the torque source and the low friction support. Although the invention has been described above in connection with particular elements employed as specific embodiments of these components of the invention, it will be appreciated that numerous alternatives exist. It is, furthermore, noted that various modifications and alterations of standard pieces of equipment may be employed for utilization of same as components of the present invention for particular applications. Thus, the theodolite or telescopic angle measuring means may be modified so as to permit observation therethrough by an operator or pilot at some remote location from the apparatus itself. Such a modification may include, for example, a mirror system. Remote control of the theodolite azimuth and elevation adjustments from the control panel 29 may be readily accomplished by the provision of electric motors controlled through a closed loop follow up servo system coupled by belt or gear means to the theodolite control elements. The star trackers employed in the present invention may be quite conventional, and reference to devices of this type may be found in the literature and in many published patents. Although it is possible to permanently affix the theodolites in position upon the platform, it may be desirable for certain applications of the invention to provide precision adjustments of one or both of these elements in order to utilize different reference stars as a matter of convenience in employing the invention for navigational purposes. Inasmuch as the overall accuracy of the invention is only as accurate as the alignment between the star trackers and the theodolite axes, it is necessary to very accurately determine and maintain the desired alignment of the star trackers, so that preferably the trackers are pinned or otherwise firmly fixed in position during utilization of the invention and particularly when any readings are being taken with the theodolite. Modification of the platform drive means is discussed at some length below, and as regards the low friction support for the platform, it is noted that the spherical surfaces of the mounting means 31 upon the platform actually form separate surfaces of a single sphere, i.e., the curvature of these surfaces lie in the surface of a single sphere. In actuality then, the platform comprises a sphere with the center portion otherwise formed so as to afford a desired level mounting space for the elements to be secured thereto. It is only by this relationship between the spherical surfaces that it is possible to attain uninhibited motion about three mutually perpendicular axes. It is, of course, possible to employ other types of low friction supports and under the relatively weightless condition of outer space, oil lubricated spherical bearings may be quite satisfactory, or alternatively an arrangement of flexures or small tethering wires may be employed. It is even possible that no support is required for the platform if it could be initially positioned adjacent a window of the space vehicle with no initial velocity. This latter condition appears at the present time somewhat difficult to achieve.

There is illustrated in FIGURE 5 of the drawings an alternative platform drive, wherein inertia wheels are utilized to provide the requisite torque for correcting deviations in the position of the platform. An inertia wheel is an old and well-known torque-producing device that utilizes a motor-driven flywheel. When a voltage is applied to the motor, a torque acts directly on the wheel and reacts directly on the motor mount. A number of inertia wheel systems are described in NASA TN D-691, "Study of Systems Using Inertia Wheels for Precise Attitude Control of a Satellite," by John S. White and Q. Marion Hausen, April 1961. There is shown in FIGURE 5 a platform 101 having a precision theodolite 102 mounted thereon with remote control drive means associated therewith upon the platform and connected by fine lead wires 103 to a remote control panel 104. A pair of star trackers 106 and 107 are shown as being mounted upon the platform and directed toward reference stars.

The platform 101, in this instance, may be mounted upon a single spherical air bearing by means of a central shaft indicated at 108 and extending downwardly from the platform into engagement with appropriate connections upon the space vehicle itself. Adjustment of the platform orientation is accomplished in this embodiment in the same general manner as described above. Thus, the star tracker 106 is shown as being connected through circuitry 111 to a first inertia wheel 112. The other star tracker 107 is illustrated as being connected through electrical circuitry 113 to an inertia wheel 114 and also through electrical circuitry 116 to an inertia wheel 117. It will be seen that the axes of the three inertia wheels 112, 114, and 117 are mutually perpendicular, so that control of platform movement is accomplished about these mutually perpendicular axes. A suitable power source 121 is connected through fine lead lines to the inertia wheels upon the platform in order to appropriately energize same in a conventional manner.

In stabilization of this platform with the connections illustrated and described above, it will be seen that the first star tracker 106 provides for adjustment of the platform position about the axes through the inertia wheel 112, while the other star tracker 107 provides for adjustment of the platform position about the axes of the wheels 114 and 117. It will be appreciated that each star tracker is capable of producing error signals in mutually perpendicular directions. Thus, for example, the star tracker 107 may control the inertia wheel 114 in accordance with variations of alignment between the tracker and reference star occurring above and below a horizontal line through the center of the star tracker and may control the inertia wheel 117 with error signals produced by variations of alignment between the star and a vertical axes through the center of the star tracker field.

The embodiment of the invention illustrated in FIGURE 5 and briefly described above is substantially the same as the embodiment illustrated in other figures of the drawing insofar as operation thereof is concerned. It is noted that the motion producing means employed in connection with the stabilized platform hereof need produce only a very small amount of torque, in view of the substantially frictionless mounting of the platform, and furthermore, that this frictionless mounting is in large part available because of the relatively weightless conditions encountered in operation of the invention under its normal operating conditions. In addition to the possibilities of employing inertia wheels or magnetic interaction for controlled movement or adjustment of the platform position, there may also be employed some type of small jets and various other low power means available to apply small torques to the platform for returning the platform to a reference position in space.

By the present invention, there is provided for the maximization of accuracy possibly available with the units employed therein. Thus, the high accuracy of star trackers is herein fully utilized by the mounting of same upon the same platform that supports the precision vernier theodolite, and in this manner the precise orientation of the platform in space then allows attainment of maximum accuracy from the theodolite itself. Use of the invention by a pilot or operator of a space vehicle does not entail physical contact with the platform itself. Thus, the vernier theodolite is remotely adjusted and may also be remotely read. It is not, however, necessary to provide this remote reading under conditions of platform stability, for once the theodolite has been set it is quite possible to cage the platform, i.e., firmly secured to the vehicle, and then to proceed to take the readings from the theodolite. It is, of course, necessary that the pilot or operator be able to look through the telescope of the theodolite during adjustment of this instrument in order to accurately align the theodolite with the reference points desired. In this respect, it is noted that the utilization of concenric circles upon the reticle of the theodolite together with cross hairs thereon materially improves the accuracy within which such an instrument may be read. Inasmuch as it is desired to align the line of sight of the theodolite telescope with a relatively luminous body that may have somewhat of an irregular shape, it has been found that the addition of concentric circles to the lens system simplifies this alignment.

The invention described above will be seen to accomplish the objects previously stated, and it is not intended to limit the present invention by the exact terms of the above description, but instead reference is made to the appended claims for a precise delineation of the true scope of this invention.

What is claimed is:
1. In combination with a manned space vehicle,
 a platform disposed within the vehicle for substantially frictionless movement relative thereto,
 at least one angle measuring device mounted upon said platform, said platform having means by which said angle measuring device may be manually operated by a passenger in said vehicle,
 a pair of photosensitive signal sources mounted upon said platform in predetermined and fixed direction toward at least one reference light source in space and producing error signals proportional to deviations of said signal sources from alignment with said light source,
 a magnetic means responsive to said error signals moving said platform for establishing thereby an invariable inertial space reference from which angles are measured by said device.
2. The combination comprising
 a space vehicle,
 a mounting platform disposed within said vehicle in substantially frictionless engagement therewith and adjacent a light-transparent wall of the vehicle.
 a plurality of star trackers affixed to said platform and each producing error signals proportional to deviations of the line of sight thereof from external reference light sources, respectively,
 control means responsive to error signals from said star trackers and applying reaction torques to said platform for moving same to a position reducing said error signals,
 a remotely controlled precision theodolite mounted upon said platform for adjustment to indicate bearing angles with a high degree of accuracy said platform comprising a frame with an aperture enabling a vehicle passenger access to said theodolite said platform having a plurality of magnets, and
 said control means including a plurality of coils disposed adjacent said magnets and energized in accordance with said error signals.
3. The combination set forth in claim 2 further defined by said platform being mounted within said space vehicle by at least a portion of a spherical air bearing,
 and said control means producing torques upon said platform about three mutually perpendicular axes for precise positioning of the platform in space with respect to said reference light sources.
4. Measuring means for a manned space vehicle comprising
 at least two star trackers disposed adjacent a window of said vehicle and adapted for alignment with reference stars, respectively,
 circuitry connected to said star trackers for producing correction signals when said trackers are misaligned with said reference stars,
 precision angle measuring means, said star trackers and said angle measuring means being connected to a mounting means,
 means moving said mounting means in response to said correction signals for maintaining said star trackers in precise alignment with said reference stars and thus providing an invariable reference plane in space for said angle measuring means,
 and said mounting means having means by which said angle measuring means may be manually operated by a vehicle passenger.

5. Measuring means for a space vehicle as set forth in claim 4 further defined by
a rigid platform mounting said star trackers and angle measuring means,
segments of a spherical surface affixed to said platform,
a substantially frictionless support for said platform by the space vehicle at said spherical surface,
a plurality of magnets carried by said platform,
and a plurality of coils energized by said correction signals and disposed adjacent said magnets for applying a restoring torque to the platform upon relative platform movement misaligning said star trackers and said reference stars.

6. Measuring means for a space vehicle as set forth in claim 4 further defined by
a rigid platform upon which star trackers and angle measuring means are affixed,
a spherical surface affixed to the platform and engaging said space vehicle in a substantially frictionless manner,
and reaction means upon upon said platform oriented to produce reactive forces about three mutually perpendicular axes,
said reaction means being controlled by said correction signals to move the platform for maintaining the star trackers in alignment with said reference stars.

7. Improved angle measuring means for a manned space vehicle comprising
a remotely controlled precision theodolite for measuring bearing angles,
a rigid platform supporting said platform, said platform comprising a frame with an aperture enabling a vehicle passenger access to said theodolite for peering through same,
a pair star trackers affixed to said platform in alignment with separate reference stars,
three-channel electrical circuitry connected to said star trackers and producing separate error signals for deviation of the star tracker alignment in three mutually perpendicular planes,
and magnetic means applying forces to said platform from said electrical circuitry in said three planes to maintain said star trackers in alignment with said reference stars,
whereby angle readings by said theodolite proceed from an invariable reference plane in space as provided by said platform.

8. Improved angle measuring means as set forth in claim 8 further defined by
means mounting said platform within the space vehicle for substantially frictionless movement,
said mounting means including a plurality of portions of a single spherical surface upon said platform,
concave spherical mounting blocks on the vehicle and matching the spherical portions on the platform,
and a low friction fluid between the mounting blocks and spherical platform surfaces.

9. Measuring means for a manned vehicle comprising a platform disposed within the vehicle for substantially frictionless movement thereto,
said platform having a plurality of convex portions,
a plurality of mounting blocks on the vehicle each having a concavity,
said convex portions of said platform being disposed adjacent said concavities, respectively,
a low friction fluid between said convex portions and said concavities,
a plurality of light-source trackers each having a line of sight,
said trackers being affixed to said platform and each generating error signals proportional to deviations of the line of sight from an external light source,
means responsive to said error signals for applying torques to said platform which tend to reduce said error signals and maintain said trackers in alignment with said external light source.

10. Apparatus in accordance with claim 9 wherein said torque applying means includes coils which are energized by said error signals.

11. Apparatus in accordance with claim 9 wherein said means for applying torques includes a plurality of signal generating rate gyroscopes affixed to said platform,
and means for summing said rate gyroscope signals with said error signals, respectively.

12. The combination comprising a support body,
a platform, said platform having a plurality of convex portions,
a plurality of mounting blocks on said body each having a concavity,
said convex portions of said platform being disposed adjacent said concavities, respectively,
a pressurized gas between said convex portions and said concavities whereby said platform engages said blocks in a substantially frictionless manner,
a plurality of light-source trackers each having a line of sight,
said trackers being affixed to said platform and each generating error signals proportional to deviations of the line of sight from a light source,
a plurality of magnets carried by said platform,
a plurality of coils disposed adjacent said magnets and energized by said error signals to move said platform and maintain said lines of sight in alignment with said light source.

13. The combination as set forth in claim 12 further defined by
a theodolite mounted on said platform whereby horizontal and vertical angles may be measured from an invariable reference plane.

14. Measuring means for a manned vehicle comprising
a platform disposed within the vehicle for substantially frictionless movement thereto,
said platform having a plurality of convex portions,
a plurality of mounting blocks on the vehicle each having a concavity,
said convex portions of said platform being disposed adjacent said concavities, respectively,
a low friction fluid between said convex portions and said concavities,
a plurality of light source trackers each having a line of sight,
said trackers being affixed to said platform and each generating error signals proportional to deviations of the line of sight from an external light source,
magnetic positioning means responsive to said error signals for applying corrective torques to said platform which tend to maintain the lines of sight of said trackers in alignment with said external light source,
means mounted on paid platform for measuring vertical and horizontal angles,
said platform having an opening permitting an operator access to said angle measuring means.

15. Measuring means for a manned vehicle comprising
a platform disposed within the vehicle for substantially frictionless movement thereto,
said platform having a plurality of convex portions,
a plurality of mounting blocks on the vehicle each having a concavity,
said convex portions of said platform being disposed adjacent said concavities, respectively,
a low friction fluid between said convex portions and said concavities,
a plurality of light-source trackers each having a line of sight, said trackers being affixed to said platform and each generating error signals proportional to deviations of the line of sight from an external light source, means responsive to said error signals for applying torques to said platform which tend to reduce said error signals and maintain said trackers in alignment with said external light source, and a theodolite mounted on said platform whereby horizontal and vertical angles may be measured from an invariable reference plane.

References Cited by the Examiner

UNITED STATES PATENTS

| 3,002,097 | 9/1961 | Nuut | 250—203 |
| 3,002,419 | 10/1961 | Vyse | 250—203 X |
| 3,015,249 | 1/1962 | Taylor | 250—203 X |
| 3,070,699 | 12/1962 | Lehmann et al. | 250—203 |

RALPH G. NILSON, *Primary Examiner.*

WALTER STOLWEIN, *Examiner.*